US012023716B2

(12) United States Patent
Barth et al.

(10) Patent No.: US 12,023,716 B2
(45) Date of Patent: Jul. 2, 2024

(54) SORTING LAYOUT FOR PIECE GOODS WITH CYLINDRICAL END POSITION DEVICE

(71) Applicant: Körber Supply Chain Logistics GmbH, Constance (DE)

(72) Inventors: Thomas Barth, Gottmadingen (DE); Philipp Pfeifer, Constance (DE)

(73) Assignee: KÖRBER SUPPLY CHAIN LOGISTICS GMBH, Constance (DE)

( * ) Notice: Subject to any disclaimer, the term of this patent is extended or adjusted under 35 U.S.C. 154(b) by 0 days.

(21) Appl. No.: 18/080,104

(22) Filed: Dec. 13, 2022

(65) Prior Publication Data

US 2023/0182176 A1 Jun. 15, 2023

(30) Foreign Application Priority Data

Dec. 13, 2021 (EP) .................................... 21213943

(51) Int. Cl.
*B07C 5/36* (2006.01)
*B07C 3/00* (2006.01)
*B07C 3/08* (2006.01)

(52) U.S. Cl.
CPC .............. *B07C 5/362* (2013.01); *B07C 3/008* (2013.01); *B07C 3/08* (2013.01); *B07C 2501/0063* (2013.01)

(58) Field of Classification Search
CPC ........... B07C 5/362; B07C 3/08; B07C 3/008; B07C 2501/0063
See application file for complete search history.

(56) References Cited

U.S. PATENT DOCUMENTS 10,094,131 B1 * 10/2018 Garcia, III ............. G06Q 30/06
11,484,914 B2 11/2022 Mandler et al.
2019/0135461 A1 5/2019 Pippin et al.
2021/0387756 A1 12/2021 Pippin et al.

FOREIGN PATENT DOCUMENTS

EP 3593913 A1 1/2020
NL 2018197 B1 7/2018
WO 2017151897 A1 9/2017

* cited by examiner

*Primary Examiner* — Jacob S. Scott
*Assistant Examiner* — Miraj T. Patel
(74) *Attorney, Agent, or Firm* — Price Heneveld LLP

(57) ABSTRACT

A sorting layout for piece goods contains a sorting mechanism and an end position configuration. The end position configuration contains a plurality of end positions, which are arranged in cylinder fashion. The end position configuration also has end positions arranged one on top of another. The sorting mechanism is adapted to pick up piece goods being sorted and to sort them into any one of the end positions of the end position configuration.

14 Claims, 5 Drawing Sheets

SORTING LAYOUT FOR PIECE GOODS WITH CYLINDRICAL END POSITION DEVICE

CROSS-REFERENCE TO RELATED APPLICATION

This application claims the priority, under 35 U.S.C. § 119, of European Patent Application EP 21 213 943.0, filed Dec. 13, 2021; the prior application is herewith incorporated by reference in its entirety.

FIELD AND BACKGROUND OF THE INVENTION

The invention relates to the technical field of sorting layouts and methods for sorting of piece goods based on a sorting mechanism and an end position arrangement.

European patent application EP 3 593 913 A1, corresponding to U.S. Pat. No. 11,484,914, discloses a sorting layout for packages having a sorting area containing a sorting mechanism which is adapted to sort a multitude of packages according to at least one piece of package-related sorting information. The sorting area also contains primary intermediate buffers, which are adapted to pick up each time at least one package and hold it temporarily. The primary intermediate buffers are adapted to be moved to a handover station in dependence on the package-related sorting information.

International patent disclosure WO 2017/151897 A1, corresponding to U.S. patent disclosure Nos. 2021/0387756 and 2019/0135461, discloses a system for bagging of packages, containing a collection conveyor, which is adapted to pick up groups of packages and deliver the transport group to a bagging station.

There is also known the residual manual sorting whereby a human work force manually removes shipments from a container and sorts them into a number of destinations, usually four to six destinations.

The use of multiaxial industrial robots and horizontal articulated-arm robots for the sorting of piece goods is also known. These robots have diverse uses, but their drawback is their complicated design and also their complicated actuation, due to the multiple axes. Furthermore, the maximum throughput and the number of end positions which can be reached horizontally as well as vertically by the robots are greatly limited. The use of portals in a plane is also known, but this has the drawback that the number of vertical end positions which can be reached by the horizontal portal is greatly limited.

SUMMARY OF THE INVENTION

Starting from the above-described prior art, the problem on which the invention is based is to make possible a simple and efficient automatic sorting of piece goods.

The problem with respect to the device is solved by a sorting layout for piece goods containing a sorting mechanism and an end position arrangement. The end position arrangement has a plurality of end positions. The end positions are arranged in cylinder fashion. The end position arrangement also contains end positions arranged one on top of another. The sorting mechanism is adapted to sort piece goods being sorted into any one of the end positions of the end position arrangement.

The problem with respect to the method is solved by a method for sorting of piece goods into an end position arrangement. The end position arrangement contains a plurality of end positions arranged one above another in cylinder fashion. According to the method, a piece good is handed over to a sorting mechanism. At least one characteristic of the piece good is automatically determined. The piece good is transported by means of the sorting mechanism to an end position of the end position arrangement coordinated with at least one characteristic and handed over by the sorting mechanism to the end position coordinated with the characteristic.

Benefits and configurations of the invention which can be used individually or in combination with each other are the subject matter of the dependent claims.

According to one exemplary embodiment, the sorting mechanism contains a portal robot which is adapted to sort a piece good being sorted into any one of the end positions of the end position arrangement. In this way, an especially easily built and reliably working sorting layout can be made possible.

According to one exemplary embodiment, the sorting mechanism contains a delivery device which is configured to pick up piece goods with form fitting and to sort them into any one of the end positions of the end position arrangement. In this way, it can be prevented that piece goods can drop out of the delivery device during a sorting process. For example, the delivery device may comprise a cross belt with strips. Preferably, the strips are arranged and dimensioned such that they stabilize the piece goods on the cross belt and thus guard them from the delivery device. Preferably, the sorting layout is configured such that a piece good lying on the cross belt can be sorted from the cross belt into any one of the end positions.

According to one exemplary embodiment, the sorting mechanism contains a linear transport mechanism and a rotation mechanism. The linear transport mechanism contains a pick-up element which is configured to pick up one of the piece goods and to move it in a linear direction. Preferably, the linear direction is oriented horizontally. The rotation mechanism is configured to rotate the linear mechanism about a preferably vertical axis. In this way, an especially easily built and reliably working sorting layout can be made possible.

According to one exemplary embodiment, the sorting mechanism has a pick-up element which is configured to pick up one of the piece goods. The sorting mechanism is configured to transport the piece good by means of the pick-up element to any one of the end positions.

According to one exemplary embodiment, the sorting mechanism comprises a lift system which is configured to move the pick-up element in the vertical direction, for example in order to transport it to any one of the end positions and hand it over thereto. This makes possible an especially easily built and reliably working sorting layout.

According to one exemplary embodiment, the sorting mechanism contains multiple pick-up elements which are configured to pick up a piece good each time and transport it to a selection of the end positions of the end position arrangement and hand it over thereto. For example, the sorting layout can be configured such that a pick-up element is assigned to a partial region of the end position arrangement in which it sorts piece goods. Preferably, the partial region covers one or more levels. The selection here is a true subset of the totality of end positions of the end position arrangement. This makes possible an efficient sorting mechanism in which multiple piece goods can be processed in parallel by different pick-up elements, their regions of action being divided up. Also, in this way, the sorting layout can be easily configured so that the pick-up elements seldom or never cross each other.

According to one exemplary embodiment, the sorting mechanism contains at least one pick-up element for picking up a piece good and is adapted to move the pick-up element on a circular and/or circulating track in order to move a piece good picked up by the pick-up element to any given one of a selection of end positions of the end position arrangement. In this way, an especially easily built and reliably working sorting layout can be made possible. According to one exemplary embodiment, the selection involves a true subset of the end positions of the end position arrangement. According to one exemplary embodiment, the selection involves all end positions of the end position arrangement.

According to one exemplary embodiment, the end position arrangement contains a fixed rack system in which the end positions are arranged. The end positions are each configured to dispense piece goods contained in the end position. The piece goods can be dispensed for example as a group and/or at a defined point in time. This makes it possible to further process as a group piece goods belonging to the same category. In this way, the piece goods can be processed more efficiently.

According to one exemplary embodiment, the end position arrangement comprises a conveyor section and is adapted to dispense piece goods assembled in a group in one or more or each end position to the conveyor section. The conveyor section is configured to take the group of piece goods to a processing unit, such as a packaging location. The packaging location can be, for example, a bagging station. In this way, a single or a limited number of bagging stations or other processing units can further process the sorted piece goods.

According to one exemplary embodiment, the end position arrangement comprises one or more racks and one or more automated guided vehicles (AGV). One or more or each of the racks each comprises one or more end position pick-up elements and is configured to be transported away by the AGVs. An end position pick-up element can be configured as a compartment or some other container, for example. This exemplary embodiment makes it possible to haul away a fully or partly filled rack when necessary. Even during the hauling, the rack being hauled away can be replaced by another rack in which piece goods can be sorted by the sorting mechanism. Thus, a large throughput and good flexibility of the sorting layout can be achieved.

According to one exemplary embodiment, the sorting layout comprises a control device. The control device is configured to activate at least the sorting mechanism and to sort one of the piece goods with the aid of a determined characteristic into an end position coordinated with the characteristic.

According to one exemplary embodiment, sorted piece goods accumulate in the end positions. For example, sorted piece goods having the same at least one characteristic accumulate in an end position coordinated with the at least one characteristic.

Further features, attributes, and benefits of the present invention will emerge from the following description making reference to the accompanying figures. In the exemplary embodiments and figures, the same or identically acting elements can each be given the same reference numbers. The elements represented and their mutual size relations should not be seen as being true to scale, but instead certain elements may be shown in comparatively larger dimension for better portrayal and/or better comprehension.

Other features which are considered as characteristic for the invention are set forth in the appended claims.

Although the invention is illustrated and described herein as embodied in a sorting layout for piece goods with a cylindrical end position device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
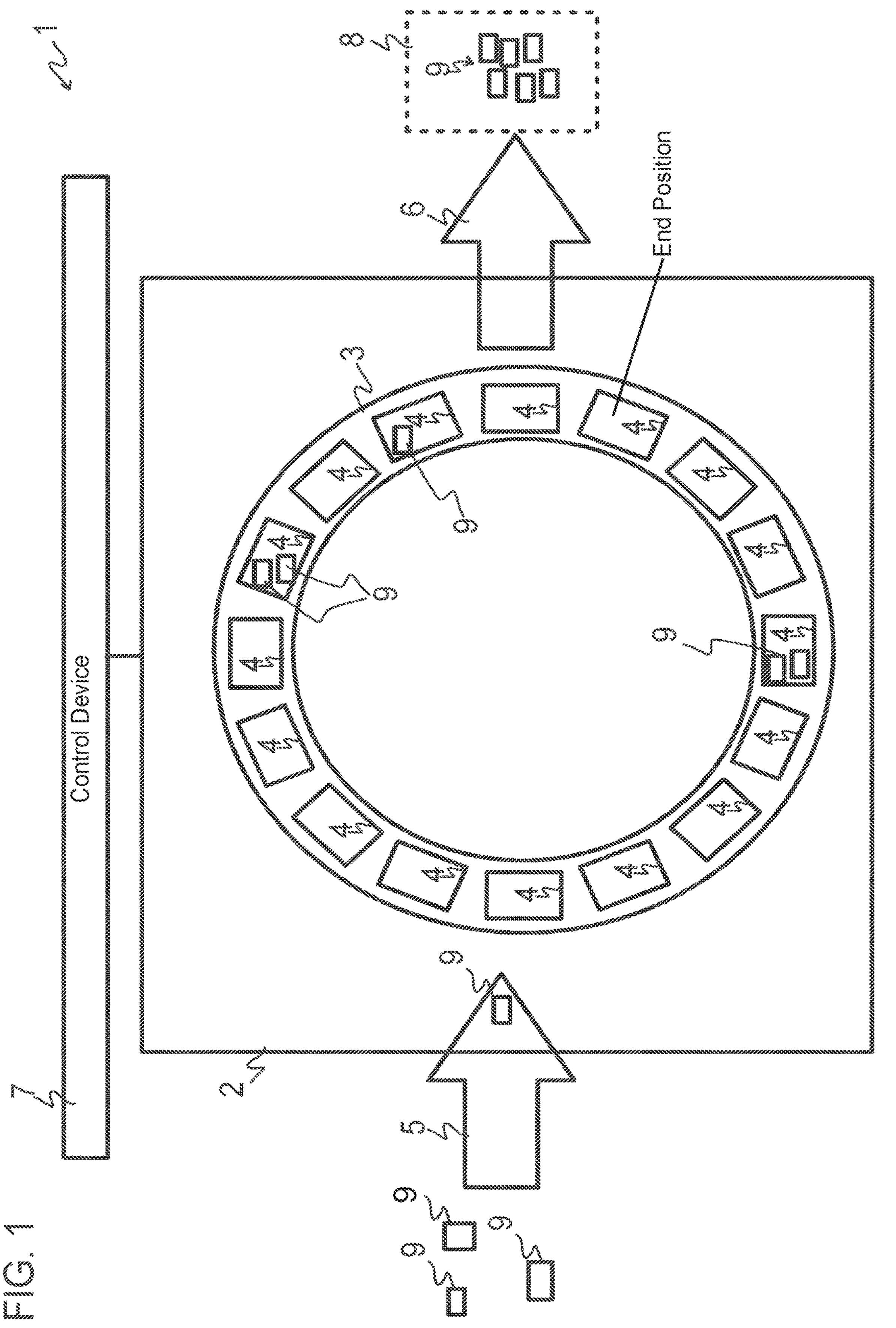
FIG. 1 is a schematic top view of a sorting layout according to one exemplary embodiment of the invention.

Referring now to the figures of the drawings in detail and first, particularly to FIG. 1 thereof, there is shown a schematic top view of a sorting layout 1 for piece goods 9 according to one exemplary embodiment of the invention. The sorting layout 1 contains an entrance 5, an exit 6, a control device 7, a sorting mechanism 2 and an end position arrangement 3. The sorting layout 1 is adapted to sort piece goods 9 automatically into one of the end positions 4.

Via the entrance 5 it is possible for the sorting layout 1 to receive unsorted piece goods 9 and furnish them to the sorting mechanism 2. Via the exit 6 sorted piece goods 9 can be delivered out from the sorting layout 1. The sorted piece goods 9 can be sorted for example into groups 8. For example, the piece goods 9 can be loosely sorted into the groups 8 or be divided up by groups 8 and packed into packaging means such as crates, boxes, racks or bags.

The end position arrangement 3 contains a plurality of end positions 4, which are arranged in cylinder fashion in the end position arrangement 3. As can be seen in FIGS. 2-5, possible end position arrangements 3 also include multiple end positions 4 situated on levels one above another. The sorting mechanism 2 is adapted to pick up the piece goods 9 being sorted and to sort them automatically into any one of the end positions 4 of the end position arrangement 3. In this way, for example, parcels or other postal piece goods or pieces of luggage can be sorted.

The control device 7 is adapted to activate the sorting layout 1, especially the sorting mechanism 2, preferably also the further elements such as the end position arrangement 3, the entrance 5 and/or the exit 6 so as to perform a sorting of the piece goods 9.

The piece goods 9 can be, for example, postal parcels or letters, but also pieces of air travel or other travel luggage on which there is affixed a legible element, such as an address, a flight number, and/or a destination airport in clear text or in the form of a barcode.

The sorting mechanism 2 contains a preferably optical detection device, which is configured to read the legible element and determine from this, with the aid of a sorting plan for example, the end position 4 in which the particular piece good should be sorted. The control device 7 is configured to activate the sorting mechanism 9 appropriately to sort the respective piece good 9 into this end position 4.

Instead of or in addition to the legible element, the detection device can also be designed to determine a physical attribute, such as weight, or a spatial dimension such as length, width, or thickness. The control device 7 is configured to activate the sorting mechanism 9 appropriately to sort the respective piece good 9 into an end position 4 coordinated with this attribute, such as an end position which is large enough to receive the piece good, or an end position which is especially provided for small or not easily handled piece goods.

Such a physical attribute and such an address both constitute characteristics with which it is possible to determine for a piece good 9 an end position 4 into which the piece good is automatically sorted.

Figure 2A:
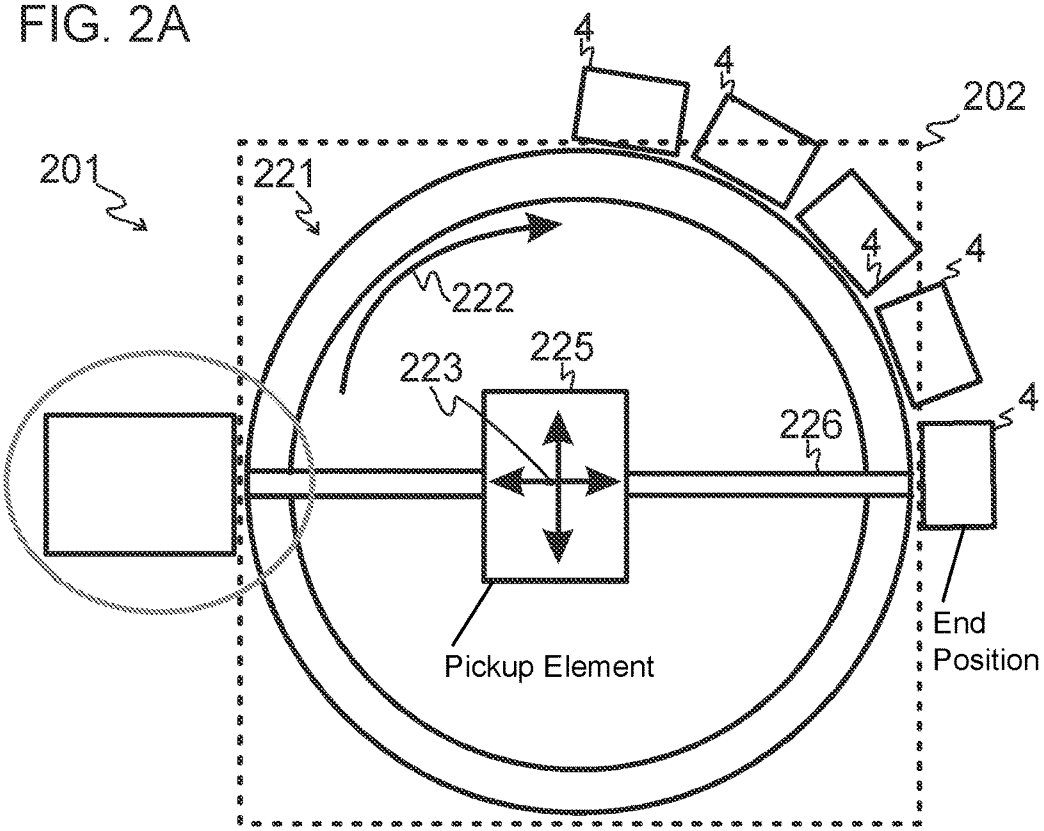
FIG. 2A is a schematic top view of the sorting layout according to one exemplary embodiment of the invention.
Figure 2B:
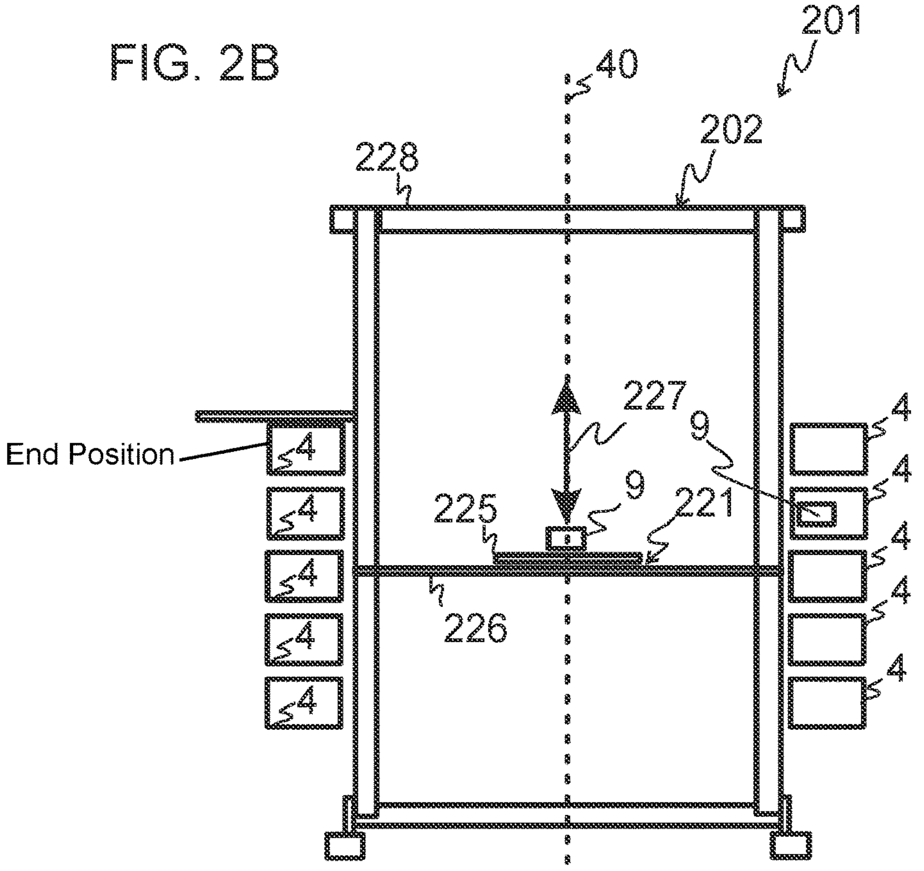
FIG. 2B is a cross-sectional view of the sorting layout of FIG. 2A looking in the horizontal direction.

FIGS. 2A and 2B show an exemplary embodiment of a further specified sorting layout 201 of the sorting layout 1 shown in FIG. 1. The sorting layout 201 contains the sorting mechanism 202 and the end position arrangement 3, of which only some of the end positions 4 arranged in a cylinder are shown for better clarity. Of course, the end positions 4 need not be arranged to encircle the envelope surface of a virtual cylinder, but instead end positions can also be arranged only along certain segments of the envelope surface or end positions can be arranged in irregular manner along the envelope surface.

The sorting mechanism 202 contains a portal robot 221. The portal robot 221 contains a pick-up element 225, a support structure 228 and a linear transport mechanism 223 which is configured to move the pick-up element 225 and with it a piece good 9 picked up by the pick-up element 225 in a horizontal linear direction, for example along a beam 226 of the support structure 228. The pick-up element 225 can be configured for example as a conveyor belt element similar to a cross belt, or it may contain a conveyor belt which picks up the piece goods and hands them over to a designated end position upon arrival of the pick-up element at that end position. In place of a conveyor belt element, there could also be a tilting tray element, a gripper element or a suction gripper element which pick up the piece goods 9 and release them again at a suitable location.

The sorting mechanism 202 furthermore contains a rotation mechanism 222, which is configured to rotate the portal robot 221 or the linear transport mechanism 223 about a vertical axis 40. The vertical axis 40 of the rotation mechanism 222 coincides with the vertical axis 40 of the cylindrical end position arrangement 3. This allows the pick-up element 225 to move, along with the translatory movement along the beam 226, to any given angle position of the cylinder envelope surface as defined by the end position arrangement.

The portal robot furthermore contains a lift system 227, which is configured to move the pick-up element 225 in the vertical direction. The sorting system 201 is thus configured to transport each of the piece goods 9, along with the pick-up element 225, to any one of the end positions 4 and hand it over thereto with very simple and reliable mechanical conveying means. The lift system 227 for example can raise and lower the portal robot, or it can also comprise a vertically situated boom arm along which the pick-up element 225 can move in the vertical direction.

In other words, the sorting mechanism 202 contains a rotatable portal robot 221 for transporting each of the piece goods 9 together with the pick-up element 225 to any one of the end positions 4 and handing them over thereto.

The linear transport mechanism 223 can be configured for one-dimensional or two-dimensional linear displacement in the horizontal plane. For this, the support structure 228 can comprise, in addition to the beam 226, a horizontal outrigger beam (not shown) situated orthogonally or crosswise to the beam 226 and a further linear transport mechanism, along which the pick-up element 225 can move additionally in linear manner. In other words, the portal robot 221, or the linear transport mechanism 223, can be configured as a line portal or an area portal.

Figure 3A:
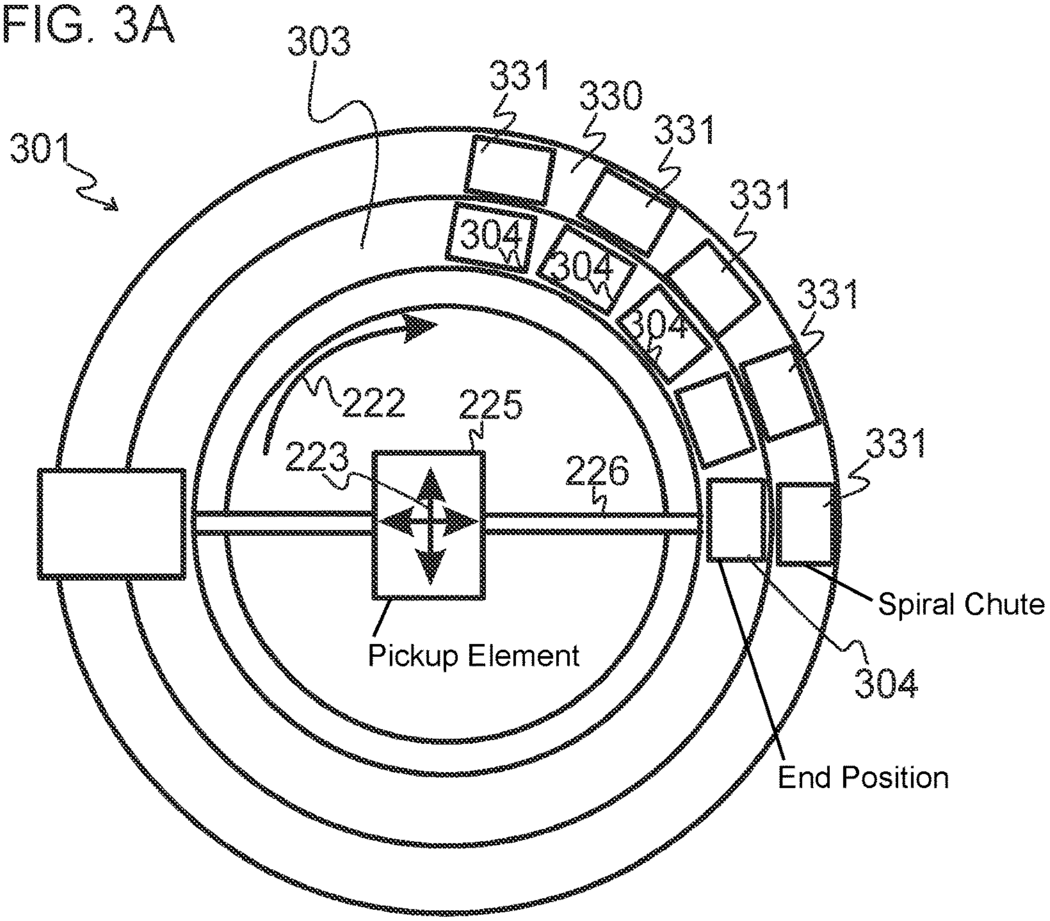
FIG. 3A is a top view of the sorting layout according to one exemplary embodiment of the invention.
Figure 3B:
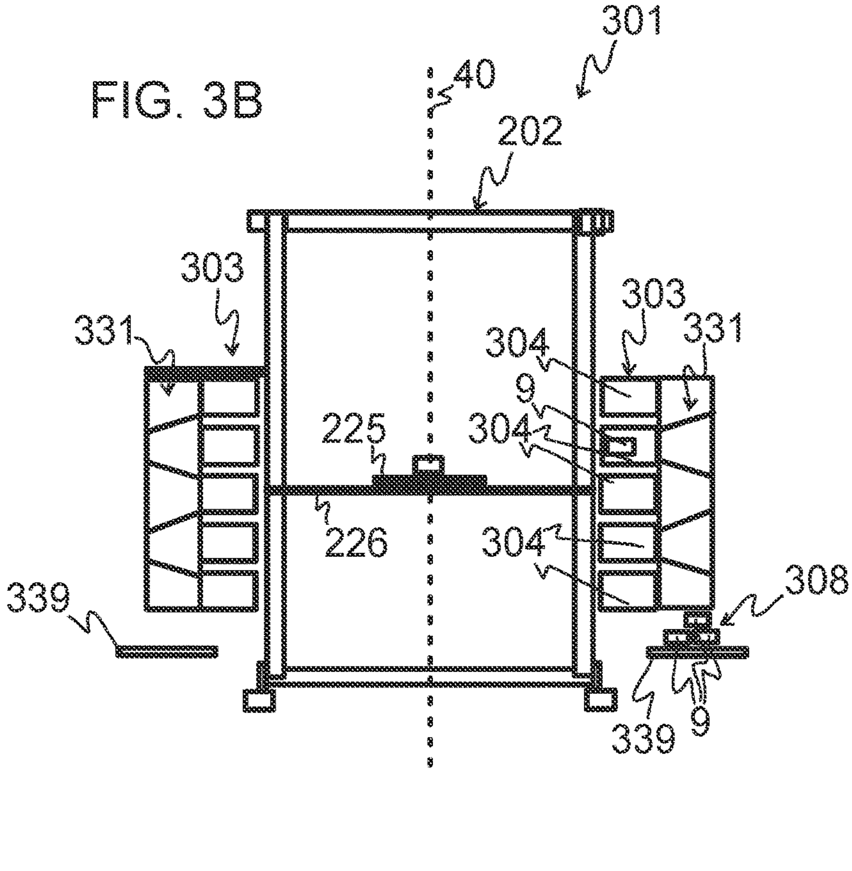
FIG. 3B is a cross-sectional view of the sorting layout of FIG. 3A looking in the horizontal direction.

FIGS. 3A and 3B show another exemplary embodiment of a further specified sorting layout 301 of the sorting layout 1 shown in FIG. 1, as well as the sorting layout 1 shown in FIGS. 2A, 2B. The sorting layout 301 comprises a sorting mechanism 202 and an end position arrangement 303. The sorting mechanism 202 corresponds at least basically to the sorting mechanism 202 of the exemplary embodiment of FIGS. 2A and 2B and is configured to sort piece goods 9 in the cylindrically arranged end positions 304 of the end position arrangement 303. Once again, the vertical axes 40 of the end position arrangement 303 and of the rotation mechanism 222 of the sorting mechanism 202 coincide.

The end position arrangement 303 contains or is a fixed rack system arranged cylindrically about the portal in multiple planes, in which the end positions 304 are situated. Arranged cylindrically about the end position arrangement 303 is a shaft system 330 with one or more shafts, configured for example as spiral chutes 331.

Each end position 304 is configured as a rack compartment and adapted to be opened individually at a defined point in time, preferably automatically, at which time the piece goods 9 contained in the end position 304 are dropped as a group 308 of piece goods into one of the shafts 331. The control device 7 is connected to the end position arrangement 303 and designed to automatically actuate an opening mechanism, which automatically opens and closes an end position 4, and thus to automatically empty the end positions 4 at a suitable time.

It is also possible to hand over multiple sorted piece goods 9 as a group 308 to one of the shafts 331, such as those arranged in end positions 304 one above the other.

At the exit of a shaft, i.e., at the lower end of a spiral chute, there is arranged a conveyor section 339, for example a conveyor belt, on which the piece goods 9 are dispensed from the shaft as a group 308. The conveyor section 339 delivers the piece goods 9 as a group to a central bagging unit (not shown), which then packs the group 308 into a bag and prepares it for hauling away.

Figure 4A:
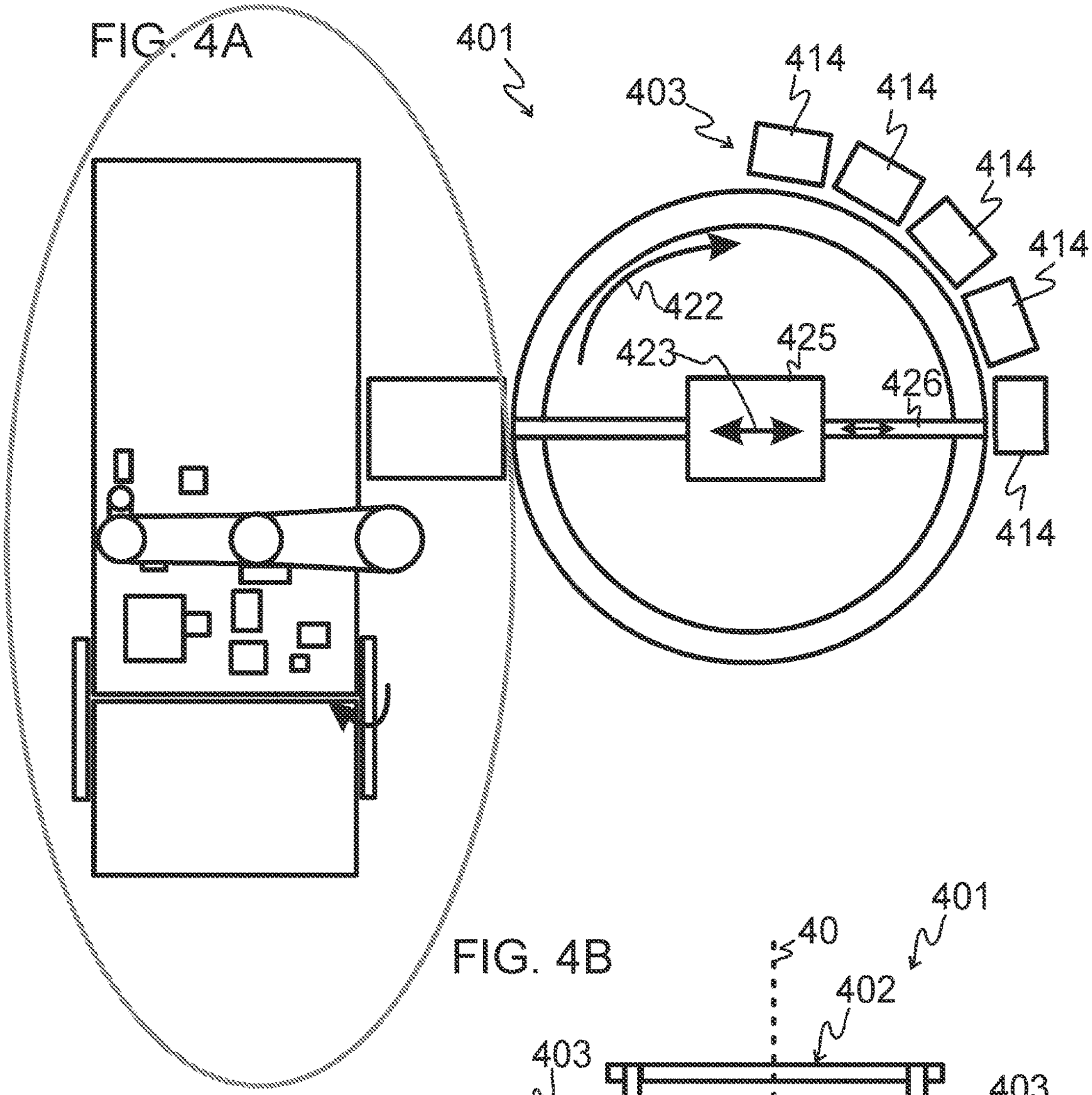
FIG. 4A is a schematic top view of a sorting layout according to one exemplary embodiment of the invention.
Figure 4B:
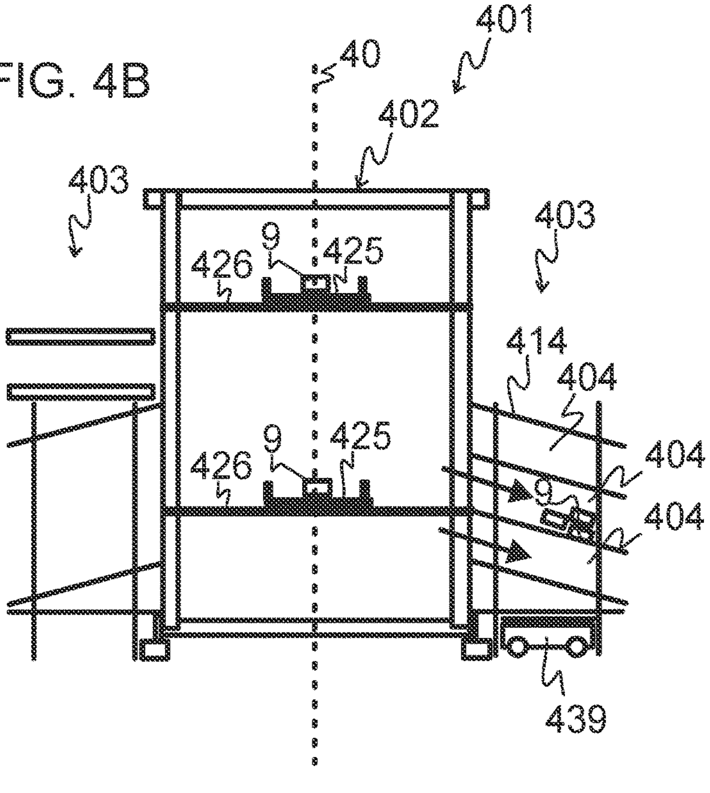
FIG. 4B is a cross-sectional view of the sorting layout of FIG. 4A looking in the horizontal direction.

FIGS. 4A and 4B show another exemplary embodiment of a further specified sorting layout 401 of the sorting layout 1 shown in FIG. 1, having a sorting mechanism 402 containing multiple portal robots 420 each situated one above the other about and rotatable about the vertical axis 40, each having at least one beam 426 and one pick-up element 425, each pick-up element 425 being able to move longitudinally to one of the beams 426.

The sorting layout 401 contains an end position arrangement 403, containing multiple cylindrically arranged upright racks 414. The portal robots can rotate about the vertical axis 40 of the cylindrical end position arrangement 403, so that a portal robot can serve one or more levels of the end position arrangement 403 each time and can sort piece goods 9 into this or these levels.

The pick-up elements 425 are thus configured to pick up a piece good 9 each time and automatically transport it to an end position 4 of a selection of end positions 4 of the end position arrangement 3 and to hand it over thereto. For example, the sorting layout 401 can be configured such that each time one of the portal robots or one of the pick-up elements 425 is responsible for a vertical region, encompassing for example one or more levels, and sorts piece goods 9 into end positions 404 which are situated in the respective region.

In the exemplary embodiment represented in FIGS. 4A and 4B, one or more or all of the pick-up elements 425 each comprise a belt conveyor, by means of which the piece goods 9 can be loaded onto the pick-up element 425 and dropped from it. The belt conveyors furthermore comprise stabilizing elements, such as strips or knobs, by means of which a piece good 9 which is picked up is stabilized in form fitting manner.

The sorting layout 401 furthermore optionally comprises at least one automated guided vehicle 439, also known as an AGV 439, which is configured to pick up a rack 414 for hauling away and/or to add a new rack 414 to the cylindrical end position arrangement 403. According to one exemplary embodiment, the AGV 439 transports the picked-up rack to a central bagging unit. At this bagging unit, the rack compartments configured as end positions 404 of the completely passive racks can be automatically opened and bagged by the bagging unit.

Figure 5A:
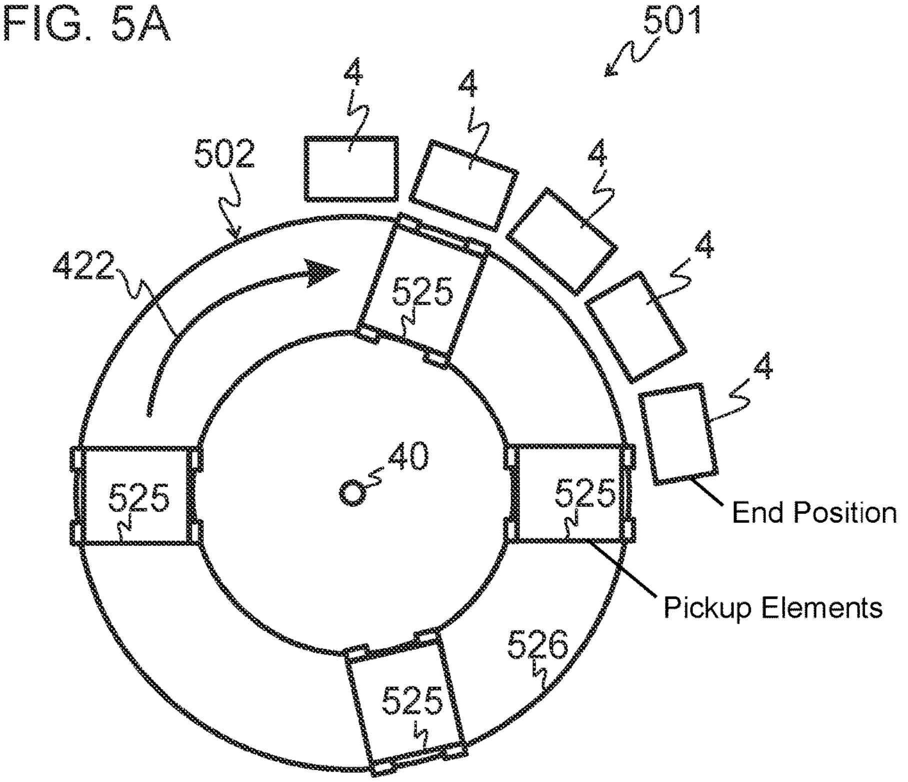
FIG. 5A is a schematic top view of a sorting layout according to one exemplary embodiment of the invention.
Figure 5B:
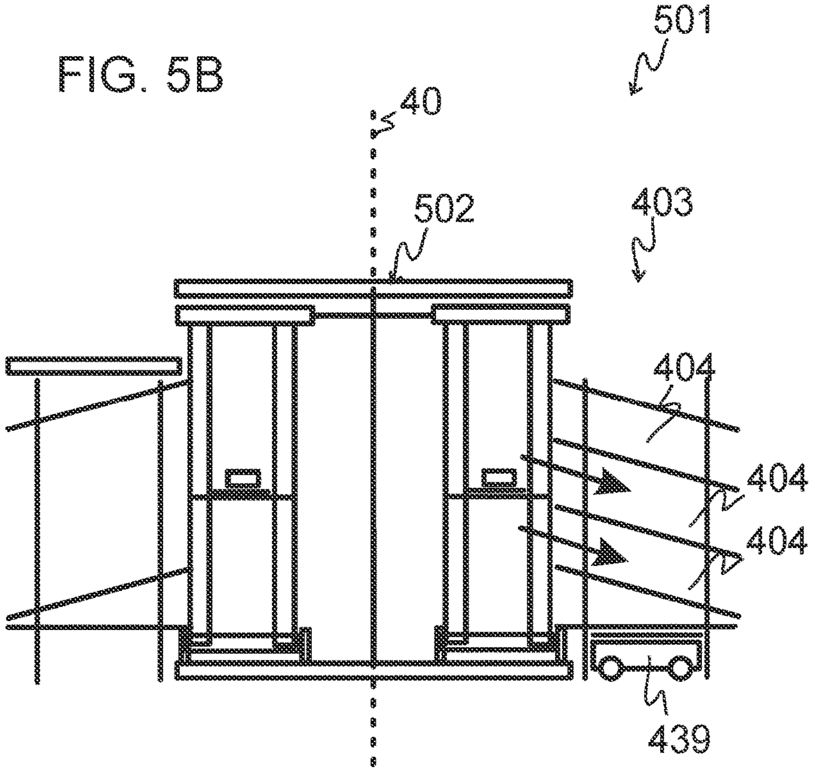
FIG. 5B is a cross-sectional view of the sorting layout of FIG. 5A looking in the horizontal direction.

FIGS. 5A and 5B show another exemplary embodiment of a further specified sorting layout 501 of the sorting layout 1 shown in FIG. 1, having a sorting mechanism 502, containing pick-up elements 525 which can move on a circular track within the cylindrical end position arrangement 3. For this, the sorting mechanism 502 contains at least one circular and horizontally arranged beam 526 along which the pick-up elements 525 can move automatically. For this, the beam 526 is situated concentrically with the cylindrical end position arrangement, and thus the axes 40 of the cylindrical end position arrangement 3 and of the beam 526 coincide.

The sorting mechanism 502 furthermore contains a lift system, making it possible to fill piece goods in end positions 4 located on different levels of the end position arrangement 3.

In FIG. 5B the sorting layout 501 contains the end position arrangement 403 of the exemplary embodiment of FIGS. 4A and 4B. In place of the end position arrangement 403, another suitable cylindrical end position arrangement can also be implemented, such as the end position arrangement 3, 303.

Thus, the sorting mechanism 502 contains at least one pick-up element 525 and is adapted to move the pick-up element 525 on a circular and/or circulating track, in order to move a piece good 9 picked up by the pick-up element 525 to any given one of a selection of end positions 4 of the end position arrangement 3 and sort it into this. The selection can be a true subset of all end positions 4 of the sorting layout 501 or also involve all of the end positions 4 of the sorting layout 501.

Of course, the numerous features in the described figures can be interchanged in many ways between the exemplary embodiments. For example, in variants of the exemplary embodiments 1, 201, 301, 401, 501 the pick-up elements can be configured as belt conveyors with or without stabilizing strips, tilting trays, mechanical grippers or suction grippers. These variants of pick-up elements can also be combined with each other in further variants within a sorting layout. Also in further variants, end position racks 403 with hauling away by AGV, automatically emptying racks 303 which empty piece goods 9 in groups onto a conveyor section 339 or end positions which are manually emptied can be combined with each other in further exemplary embodiments in the sorting layouts 1, 201, 301, 401, 501.

Further exemplary embodiments involve a dynamic allocation of individual physical compartments to a large virtual end position. In this way, end positions of different size can be dynamically realized. Thanks to the variable use of the individual rack compartments, the sorting depth can be adapted optionally and dynamically.

According to one exemplary embodiment, the method for sorting of piece goods is fully automatic. According to one exemplary embodiment, the method involves a singulation and sorting process. Preferably, the singulation process is separate from the sorting process, so that the method is divided into a singulation process and a sorting process.

The singulation process is only necessary when a flow of piece goods 9 supplied to the entrance 5 has not already been singulated. In some circumstances, one singulation process is sufficient for multiple sorting processes. The singulation process can be performed, for example, by a robot.

According to one exemplary embodiment, the method for sorting of piece goods is realized by a lightweight portal robot with a form-fitting delivery device (for example, with a cross belt having strips). The use of a lightweight portal robot allows high dynamics and the reaching of many end positions. According to further exemplary embodiments, a portal arrangement can be circular or linear. According to further exemplary embodiments, the end positions can be arranged in multiple planes one above the other. According to further exemplary embodiments, a scalability is possible due both to the arrangement of the end positions in the plane and also along the height.

Although the invention has been illustrated and described more closely in detail by the preferred exemplary embodiment, the invention is not limited by the disclosed examples. Variations thereof can be derived by the person skilled in the art without leaving the scope of protection of the invention, as defined by the following patent claims.

The invention claimed is:

1. A sorting layout for piece goods, comprising:

a sorting mechanism; and an end position configuration having a plurality of end positions disposed in a cylinder fashion, said end position configuration further having some of said end positions disposed one on top of another, wherein said sorting mechanism is adapted to sort the piece goods being sorted into any one of said end positions of said end position configuration, and wherein said end position configuration contains at least one rack and at least one automated guided vehicle (AGV), and said at least one rack has at least one end position pick-up element and is configured to be transported away by said at least one automated guided vehicle.

2. The sorting layout according to claim 1, wherein said sorting mechanism has a portal robot which is adapted to sort a piece good being sorted into any one of said end positions of said end position configuration.

3. The sorting layout according to claim 1, wherein said sorting mechanism contains a delivery device which is configured to pick up the piece goods in a form fitting manner and to sort them into any one of said end positions of said end position configuration.

4. The sorting layout according to claim 1, wherein said sorting mechanism contains a linear transport mechanism and a rotation mechanism, wherein said linear transport mechanism has a pick-up element which is configured to pick up one of the piece goods and to move it in a linear direction, and said rotation mechanism is configured to rotate said linear transport mechanism.

5. The sorting layout according to claim 1, wherein said sorting mechanism contains a pick-up element which is configured to pick up one of the piece goods, said sorting mechanism is configured to transport the piece good in said pick-up element to any one of said end positions; and said sorting mechanism has a lift system which is configured to move said pick-up element in a vertical direction.

6. The sorting layout according to claim 1, wherein said sorting mechanism has multiple pick-up elements which are configured to pick up a piece good each time and transport it to a selection of said end positions of said end position configuration and hand it over thereto.

7. The sorting layout according to claim 1, wherein said sorting mechanism contains at least one pick-up element for picking up a piece good and is adapted to move said pick-up element on a circular and/or circulating track in order to move the piece good picked up by said pick-up element to any given one of a selection of said end positions of said end position configuration.

8. The sorting layout according to claim 1, wherein said end position configuration has a fixed rack system in which said end positions are disposed, said end positions being each configured to dispense the piece goods disposed at the respect end position of the end positions.

9. The sorting layout according to claim 8, further comprising a conveyor section, wherein said end position configuration is adapted to dispense the piece goods assembled in a group in an end position of the end positions to said conveyor section, said conveyor section being configured to take the group of the piece goods to a processing unit.

10. The sorting layout according to claim 1, further comprising a controller configured to activate at least said sorting mechanism and sort one of the piece goods with an aid of a determined characteristic into an end position of the end positions coordinated with the characteristic.

11. A method for sorting piece goods into an end position configuration having a plurality of end positions disposed one above another and next to each other in a cylinder manner, which comprises the steps of:

handing over a piece good to a sorting mechanism;

automatically determining of at least one characteristic of the piece good;

transporting the piece good via the sorting mechanism to one of the end positions of the end position configuration coordinated with the at least one characteristic; and handing over the piece good by the sorting mechanism to the end position coordinated with the at least one characteristic, and wherein said end position configuration contains at least one rack and at least one automated guided vehicle (AGV), and said at least one rack has at least one end position pick-up element and is configured to be transported away by said at least one automated guided vehicle.

12. The method according to claim 11, wherein said sorting mechanism has a portal robot which transports the piece good to the end position coordinated with the at least one characteristic.

13. The method according to claim 11, wherein the sorting mechanism has a delivery device which is configured to pick up the piece goods in a form fitting manner and to sort them into any one of the end positions of the end position configuration.

14. The method according to claim 11, wherein the transporting of the piece good to the end position coordinated with the at least one characteristic is done by means of a linear transport mechanism and a rotation mechanism, wherein the linear transport mechanism transports the piece good in a linear direction and the rotation mechanism rotates the linear transport mechanism.

* * * * *